Sept. 2, 1930.    J. L. CREVELING    1,774,873
ELECTRIC SYSTEM
Original Filed Dec. 7, 1925
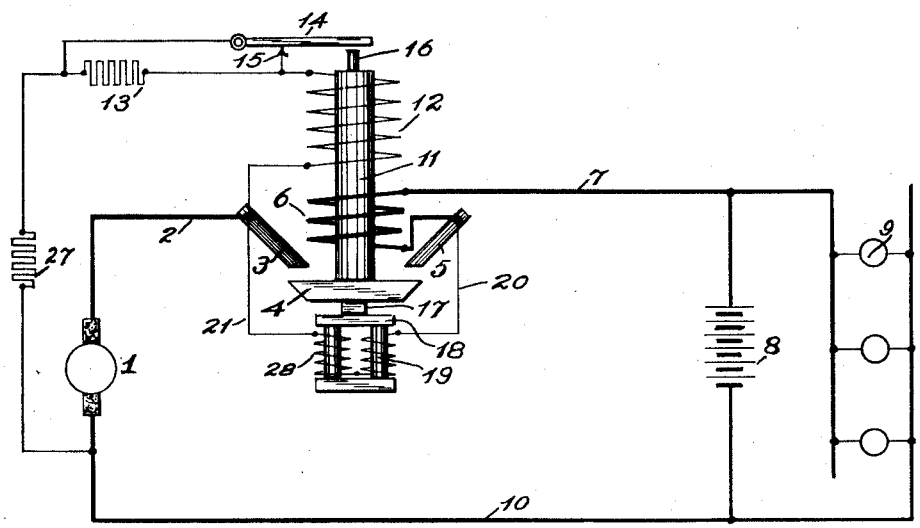
Fig. I.
Fig. III.
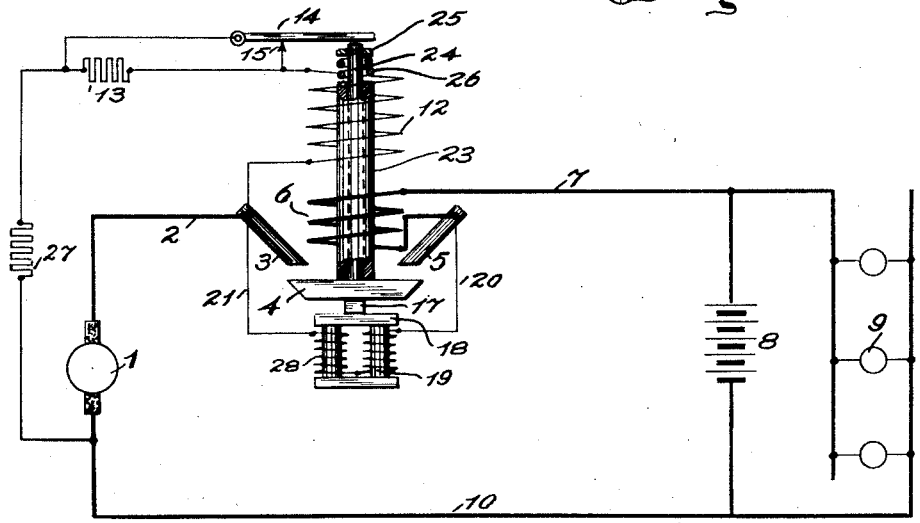
Fig. II.
INVENTOR:
John L. Creveling Patented Sept. 2, 1930

1,774,873

UNITED STATES PATENT OFFICE

JOHN L. CREVELING, OF NEAR TUCSON, ARIZONA, ASSIGNOR, BY MESNE ASSIGNMENTS, TO SIMPLEX EQUIPMENT COMPANY, INC., OF NEW YORK, N. Y., A CORPORATION OF DELAWARE

ELECTRIC SYSTEM

Application filed December 7, 1925, Serial No. 73,537. Renewed June 5, 1929.

My invention pertains to that class of electric systems wherein a dynamo or generator is used to charge a storage battery and operate lamps or other translating devices which are supplied by the battery when the dynamo is inoperative. As such systems are particularly applicable for the lighting of railway cars where the dynamo is driven at variable speed and subjected to stopping and starting, my invention will be described with particular reference to such a carlighting system.

In the drawing, Fig. I is a diagrammatic representation of one type of system comprehending the elements of my invention.

Fig. II is a diagrammatic representation showing a modified embodiment of my invention;

Fig. III is a partial elevation of portions of the devices used in Figs. I and II.

Referring particularly to Fig. I, 1 represents a dynamo or generator which may be of any suitable type as ordinarily used for the lighting of a railway car, it being understood that the generator is provided with a proper regulating means to compensate for reversals in direction of rotation and for speed changes in such manner that the generator is suitable for charging the storage battery 8 and maintaining the lamps or other translating devices 9 whenever its speed is above a predetermined value. As such generators, together with their regulating devices, are now common articles of commerce and well-known in the art, details, further than the mere diagrammatic representation of such a machine, are omitted for the sake of simplicity and clearness in illustration.

The principal object of my present invention is to provide automatic means for connecting the generator with the storage battery when their electromotive forces are substantially equal and as nearly as possible exactly equal, and to disconnect the generator from the battery when the electromotive force of the generator is very slightly below that of the battery so as to prevent more than a negligible back discharge from the battery therethrough.

It is a further object of my invention that the generator shall be connected with and disconnected from the battery in the proper manner throughout a considerable change in battery voltage which, in practice, is more or less variable within certain reasonably wide limits, which may depend upon the condition of charge of the battery. In many practical operating systems in use to-day, the voltage at which it is desirable to connect the generator and the battery varies from 28 to 40 volts, or thereabouts.

The dynamo 1 has its positive brush connected as by wire 2 with the flexible brush 3 adapted to make contact with the conducting member 4 when said member 4 is sufficiently raised. 5 is a flexible brush similar to that shown at 3 and connected through the solenoid 6 with the wire 7 which is carried to the positive side of the storage battery 8 and the positive side of the lamps or other translating devices indicated at 9, return from the translating devices 9 and the battery 8 being made to the generator through the wire 10. 11 is a core of iron or other magnetic material within the solenoid 6 and united to the conducting member 4 in such manner as to lift the same into contact with the brushes 3 and 5 when the core 11 is sufficiently raised. 12 is a voltage coil or winding surrounding the core 11 and tending when energized to lift the same and cause contact between 3, 4 and 5. The coil 12 is connected, as indicated, in shunt across the generator leads, and has in series therewith a resistance comprising portions 27 and 13, the portion 13 of which is shunted out as by means of the lever 14 and contact 15, when the core 11 is in the position indicated in the drawing, in which position 13 is substantially ineffective and 27 is so proportioned that the coil 12 tends to close the circuit at 3, 4, 5, when a voltage is reached by the generator slightly below that at which it is desired at any time to connect the dynamo with the battery circuit. 16 is an extension carried by the core 11 and may be made of insulating material so arranged that when the core has been raised until the contact between 3, 4, 5 is almost made, the lever 14 will not be affected; but, when the core 11 travels further and completes the contact 3, 4, 5, the lever 14 will be lifted from the contact 15 and throw the resistance 13 in series with the coil 12. The arrangement of the solenoid 6 is such that when current flows from the generator to the battery 8 or translating devices 9, such current tends to assist the coil 12 in raising the core 11 and preserving a good contact at 3, 4, 5, while a reversal of current, as when the battery discharges through the dynamo, tends to weaken the effect of coil 12 and cause the core 11 to drop into the position shown in the drawing and open the contact 3, 4, 5. The member 4 carries the member 17, preferably of non-magnetic material, to which is attached the armature or keeper 18, of iron or other magnetic material, which rests upon the cores 19 of an electromagnet, provided with the windings 28 in shunt across the brushes 5 and 3, as by wires 20 and 21, the electromagnet 19—28 serving to hold core 11 and contact 4 in the positions shown in the drawing when the winding 28 is energized sufficiently.

In the structure of Fig. II, like numerals are used to indicate like parts, and the only modification intended to be brought out by the use of this figure is a core 23 which is not rigidly connected with the contact member 4 as is the core 11 of Fig. I. The core 23 is a tube of iron or other magnetic material slidably mounted upon a rod 24, of brass or other non-magnetic material, which is attached to the member 4 and provided with a nut 25 at its upper end, which is screwed down upon the compression spring 26 resting upon the upper end of the hollow core 23. The arrangement is such that, if the member 4 be held in the position shown in Fig. II, and the coil 12 be sufficiently energized, it will raise the core 23 against the action of spring 26, and then, if the keeper 18 be released, the member 4 will spring quickly into contact with the brushes 3 and 5 and the contact 15—14 will be opened.

While I have indicated the keeper 18 as in contact with the magnet cores 19, it is obvious that any suitable means may be employed to keep the armature and the pole-pieces of the magnet 28—19 from "freezing", as, for example, that shown in Fig. III, wherein the core 19 is provided with a small extension of nonmagnetic material, as indicated at 22, in a manner well-known in this art.

An operation of my invention is substantially as follows, referring particularly to Fig. I:

Starting with the generator 1 at rest and the various instrumentalities in the positions shown in the drawing, the generator circuit will be broken at 3, 4, 5, and there will be no back discharge from the storage battery to the generator through this contact. However, there will be a back discharge through wire 20, winding 28 and wire 21 around the said contact 3, 4, 5; and I preferably make the winding 28 of many convolutions of a very fine wire so that this path is of relatively very high resistance and the current flowing therethrough is very small. This very small current is capable of causing the magnet to exert a very strong pull upon the keeper 18, which serves to lock the main switch open under these conditions; and, while this very small current is not an appreciable drain upon the battery, it is serviceable in causing the generator to build up properly when it is started up. And, for the purpose of properly energizing the winding 28, I do not require any greater current to flow from the battery through the generator while the latter is at rest than is commonly employed in practice for the mere purpose of insuring proper building-up of the generator, most of the systems in practice to-day using a mere ohmic resistance for this purpose connected in the same manner as coil 28, which resistance has no other function.

If, now, the generator be started, its voltage will rise and coil 12 will tend to lift the core 11 and close contact 3, 4, 5. When the minimum voltage is reached at which it may ever be desired to close the switch 3—4—5, coil 12 would close the same if it were not for the action of magnet 28—19 which will not permit the coil 12 to close the switch unless the battery voltage be substantially at this minimum value; for, if the battery voltage be above this minimum, there will be a slight flow of current from the battery through the winding 28 causing the keeper 18 to still be held in the position shown in the drawing, and the winding 12 will be unable to lift the core 11 until the generator voltage and the battery voltage are substantially equal and the current in the coil 28 is subtantially nil. When this point is reached, the magnet 28—19 will release its keeper 18 and the coil 12 will quickly raise the core 11 and close the circuit between the generator and the battery at 3, 4, 5, and open contact at 14—15, which in turn will insert the resistance 13 in series with the magnet 12 which will now be able to hold the contact 3, 4, 5, closed, as resistance 13 is so proportioned that is compensates for the difference between the number of ampere turns necessary in 12 to close the switch and the number required to hold it closed after this has been accomplished.

If, now, the generator have its speed increased so as to supply considerable current to the battery and translating devices, this current flowing through the coil 6 will assist the coil 12 in maintaining a good contact at 3, 4, 5. If, now, the generator slow down until its voltage is very slightly below that of the battery 8, a slight back discharge through the coil 6 will so weaken the effect of the coil 12 with the resistance 13 in circuit that the core 11 and contact member 4 will drop into the positions indicated in the drawing. And, if the voltage of the generator be even very slightly below the battery voltage, the current discharging back from the battery through 28 will hold the keeper 18 locked across the poles of the magnet 28—19 until the generator voltage again be raised until equal to that of the battery, whereupon the above outlined cycle will be repeated.

An operation of that modification indicated in Fig. II may be readily followed from the above operation with respect to Fig. I, it merely being noted that the coil 12 may raise the core 23 against the action of spring 26 before the generator voltage is equal to that of the battery and while the member 4 is held in the position shown in the drawing by the magnet 28—19. Then, when the voltage of the generator equals that of the battery, the magnet 28—19 will release the keeper 18 and the same will allow the spring 26 to snap the member 4 into contact with the brushes 3 and 5 in an obvious manner.

It will be noted that by proper proportioning of coils 12 and 28 and their cooperating parts, I can readily so arrange my invention that if the battery voltage should fall so low at any time when the contact 3—4—5 is broken (as when the battery is overdischarged), that the closing of the contact 3—4—5 would cause a dangerous current to be supplied to the battery, (as might be the case with some types of regulators), the contact 3—4—5 will not be closed even when the generator reaches the full voltage as limited by the regulating means. That is, I may so arrange the coils 12 and 28 that, when the battery voltage is below a selected value, current will flow from the generator through the winding 28 to the battery as soon as the generator slightly exceeds this very low battery voltage, and this, if desired, may be a voltage below that necessary to cause 12 to be able to lift the core 11; and, therefore, the contact 3—4—5 will be locked open so long as the battery voltage is so low that it would be dangerous or undesirable to connect it with the generator.

It will be further noted that I have provided a very simple means whereby the generator and battery may be connected and disconnected when their voltages are substantially equal, and that this is accomplished through a very simple arrangement of the electromagnet 19—28, which can be applied with very little difficulty to most of the automatic switches now in service as the majority of such switches comprise the instrumentalities 3, 4, 5, 6, 11 and 12.

I do not wish in any way to limit myself to any of the details of construction or modes of operation herein given to illustrate an embodiment of my invention, for it will be obvious that wide departure in the way of details both in construction and operation may be made without departing from the spirit and scope of my invention which is as set forth in the following claims:

1. The combination with a generator, a storage battery charged thereby, and automatic switch mechanism adapted to connect and disconnect the generator and battery, comprehending operating means, circuit controlling means and resilient means through which one may affect the other, of means for restraining said mechanism from connecting the generator and battery including electromagnetically attracted means affected by a difference in voltage between the generator and battery affecting the circuit controlling means.

2. The combination with a generator, a storage battery charged thereby, and automatic switch mechanism adapted to connect and disconnect the generator and battery, comprehending operating means, circuit controlling means and resilient means through which one may affect the other, of means for mechanically restraining said mechanism from connecting the generator and battery including electromagnetically attracted means affected by a difference in voltage between the generator and battery affecting the circuit controlling means.

3. The combination with a generator, a storage battery charged thereby, and automatic switch mechanism adapted to connect and disconnect the generator and battery, comprehending operating means, circuit controlling means and resilient means through which one may affect the other, of means for restraining said mechanism from connecting the generator and battery including electromagnetically attracted means affected by a difference in voltage between the generator and battery affecting the operating means.

4. The combination with a generator, a storage battery charged thereby, and automatic switch mechanism adapted to connect and disconnect the generator and battery, comprehending operating means, circuit controlling means and resilient means through which one may affect the other, of means for restraining said mechanism from connecting the generator and battery including electromagnetically attracted means affected by a difference in voltage between the generator and battery and serving to always prevent connection of the generator and battery when the battery voltage is below a predetermined value.

5. The combination with a generator, a storage battery charged thereby, and an automatic switch adapted to connect and disconnect the generator and battery including means capable of normally causing said connection when the generator voltage is appreciably below the battery voltage and means for adjusting the operating standard thereof affected by the operation of the switch, of means for controlling an operation of said switch including electromagnetic means affected by difference in voltage between the generator and battery and allowing the connection to be made only when the generator and battery voltages are substantially equal.

6. The combination with a generator, a storage battery charged thereby and an automatic switch adapted to connect and disconnect the generator and battery including means capable of normally causing said connection when the generator voltage is appreciably below the battery voltage and means for adjusting the operating standard thereof affected by the operation of the switch, of means for controlling the closing of said switch including electromagnetic means affected by difference in voltage between the generator and battery and means affected thereby to prevent the closing of said switch whenever such difference in voltage exists.

7. The combination with a generator, a storage battery and automatic switch capable of connecting the generator and battery when the generator voltage reaches the lowest value at which it is desired to ever connect it with the battery, of means for restraining said switch from causing such connection when the generator voltage is greater than the above-mentioned value but below that of the battery, comprising an electromagnet energized by the voltage difference between the generator and battery capable of holding said switch open throughout all voltages attained by the generator in service while an appreciable difference exists between the generator and battery voltages.

JOHN L. CREVELING.